(12) United States Patent
Sakurai

(10) Patent No.: US 12,175,726 B2
(45) Date of Patent: Dec. 24, 2024

(54) INFORMATION PROCESSING SYSTEM FOR IDENTIFYING IDENTIFICATION INFORMATION OF OBJECT USING MACHINE LEARNING MODEL AND DETERMINING INSPECTION SETTINGS FOR OBJECT BASED ON IDENTIFIED IDENTIFICATION INFORMATION THEREOF

(71) Applicant: BROTHER KOGYO KABUSHIKI KAISHA, Nagoya (JP)

(72) Inventor: Koichi Sakurai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 151 days.

(21) Appl. No.: 17/537,011

(22) Filed: Nov. 29, 2021

(65) Prior Publication Data
US 2022/0172453 A1 Jun. 2, 2022

(30) Foreign Application Priority Data
Nov. 30, 2020 (JP) ................................ 2020-199164

(51) Int. Cl.
*G06V 10/70* (2022.01)
*H04N 23/61* (2023.01)

(52) U.S. Cl.
CPC ............. *G06V 10/70* (2022.01); *H04N 23/61* (2023.01)

(58) Field of Classification Search
None
See application file for complete search history.

(56) References Cited

U.S. PATENT DOCUMENTS

| | | | |
|---|---|---|---|
| 2002/0128758 A1* | 9/2002 | Hiramatsu | G05B 23/0256 340/438 |
| 2019/0188845 A1* | 6/2019 | Tamai | G06V 10/87 |
| 2020/0166909 A1* | 5/2020 | Noone | G06N 20/00 |
| 2021/0247324 A1* | 8/2021 | Naruse | G06N 20/00 |
| 2022/0237772 A1* | 7/2022 | Krueger | G06N 20/00 |
| 2022/0277439 A1* | 9/2022 | Ikeda | G06T 7/70 |
| 2023/0096532 A1* | 3/2023 | Tsubaki | G06T 1/0007 382/141 |

FOREIGN PATENT DOCUMENTS

| | | | | |
|---|---|---|---|---|
| EP | 2751748 B1 * | 5/2019 | | G06K 9/00201 |
| JP | 2002-182737 A | 6/2002 | | |
| JP | 2005-181103 A | 7/2005 | | |
| JP | 2006-208009 A | 8/2006 | | |
| JP | 2012-517653 A | 8/2012 | | |

(Continued)

OTHER PUBLICATIONS

International Search Report and Written Opinion of the International Searching Authority, mailed on Feb. 22, 2022, for International Application No. PCT/JP2021/043681.

*Primary Examiner* — Tahmina N Ansari
(74) *Attorney, Agent, or Firm* — Baker Botts L.L.P.

(57) ABSTRACT

An information processing system includes a processor configured to perform: (a) identifying, by inputting photographic image data representing a photographic image of an object into a machine learning model, identification information of the object; and (b) determining, based on the identification information identified in (a), inspection settings used for inspecting the object.

7 Claims, 11 Drawing Sheets

(56) References Cited

FOREIGN PATENT DOCUMENTS

| | | | |
|---|---|---|---|
| JP | 2018-132962 | A | 8/2018 |
| JP | 2019-531547 | A | 10/2019 |
| JP | 2020-030145 | A | 2/2020 |
| JP | 2020-166315 | A | 10/2020 |
| WO | 2010/096617 | A2 | 8/2010 |
| WO | 2018/048355 | A1 | 3/2018 |

\* cited by examiner

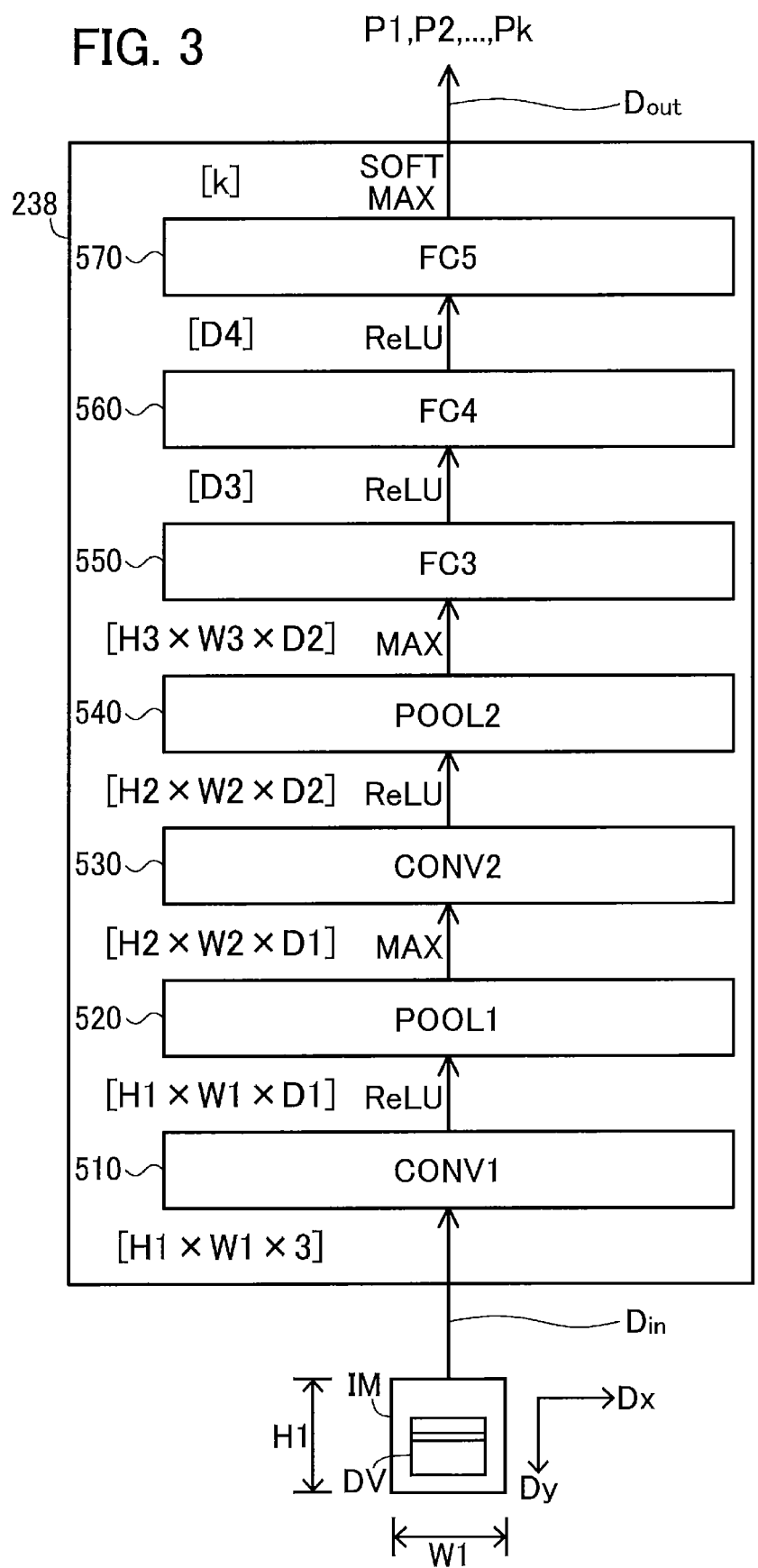

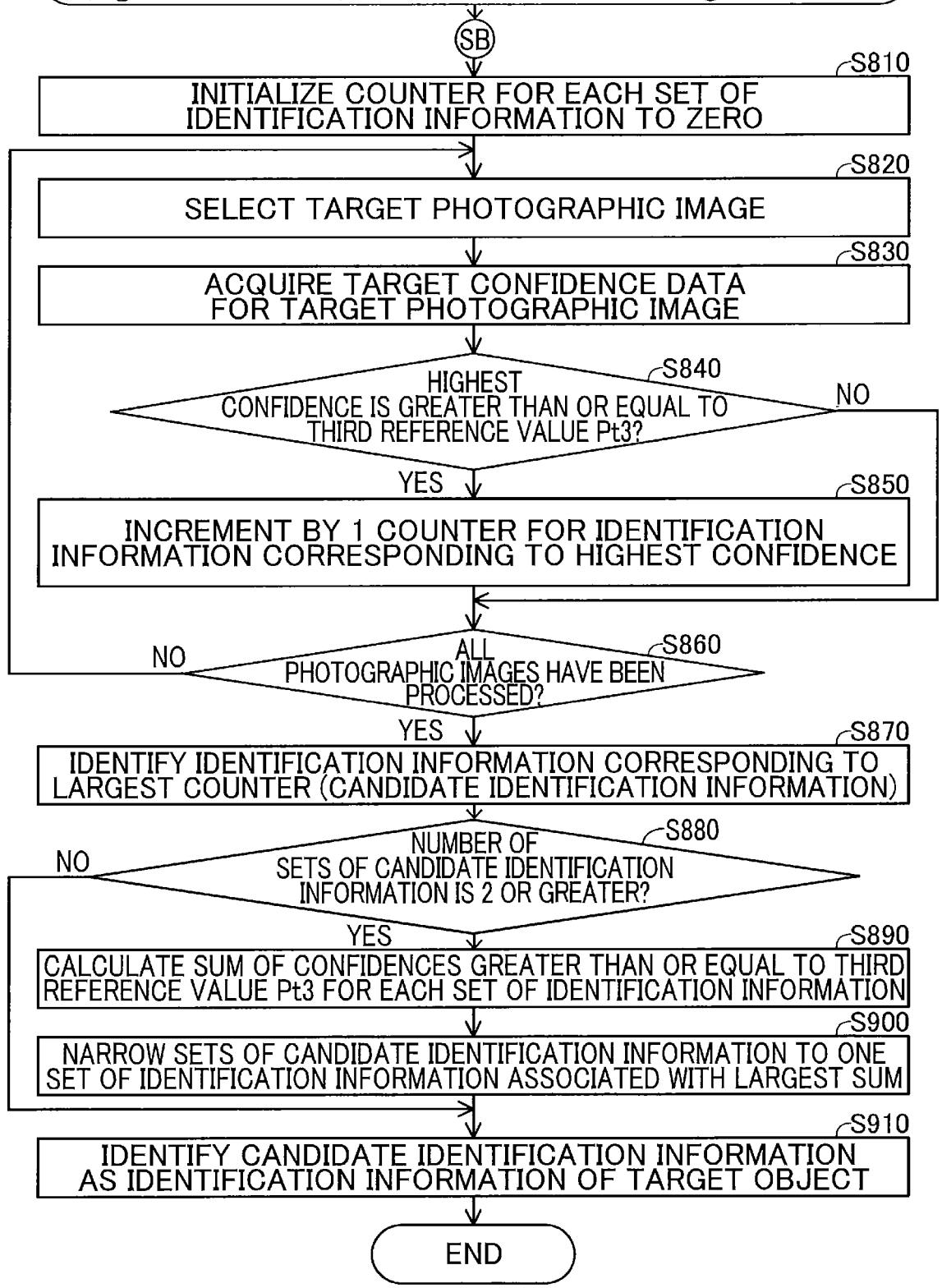

INFORMATION PROCESSING SYSTEM FOR IDENTIFYING IDENTIFICATION INFORMATION OF OBJECT USING MACHINE LEARNING MODEL AND DETERMINING INSPECTION SETTINGS FOR OBJECT BASED ON IDENTIFIED IDENTIFICATION INFORMATION THEREOF

CROSS REFERENCE TO RELATED APPLICATIONS

This application claims priority from Japanese Patent Application No. 2020-199164 filed Nov. 30, 2020. The entire content of the priority application is incorporated herein by reference.

BACKGROUND

Inspections have conventionally been conducted on a variety of objects, such as household electric appliances, vehicle-mounted control units, and circuit boards. An inspection program, procedures, and the like for inspecting objects may have various settings. There has been known a technique for storing an inspection program in a control unit to be used for inspecting the control unit itself in order that a common inspection device can be used for inspecting a plurality of types of control units.

SUMMARY

When inspecting objects of a plurality of types, different inspection settings may be used according to identification information for the object (model name, product type, or the like). Identification information for an object is identified in order to use suitable settings for inspection. However, in a case where a configuration is employed in which information related to the identification information for an object is stored in the object for purposes of identifying the identification information, flexibility in the construction of the object is restricted. This method requires the object to have a storage device for storing information, for example. On the other hand, in a case where a configuration is employed in which the user identifies the identification information for the object during inspection, flexibility in the construction of the object can be improved, but the user's burden is increased. Hence, the configuration or method of determining settings for inspecting objects has room for improvement.

In view of the foregoing, it is an object of the present disclosure to provide a technique for determining suitable settings for inspecting objects.

In order to attain the above and other object, according to one aspect, the present disclosure provides an information processing system including a processor configured to perform: (a) identifying, by inputting photographic image data representing a photographic image of an object into a machine learning model, identification information of the object; and (b) determining, based on the identification information identified in (a), inspection settings used for inspecting the object.

In the above configuration, settings for inspecting an object can be set to settings suitable for the identification information of the object.

According to another aspect, the present disclosure provides an information processing method including: (a) identifying, by inputting photographic image data representing a photographic image of an object into a machine learning model, identification information of the object; and (b) determining, based on the identification information identified in (a), inspection settings used for inspecting the object.

Note that the technique of the present disclosure can be implemented in various forms, such as: an information processing apparatus; computer-readable program instructions for realizing the functions of this apparatus, the above system, or the above method; and a storage medium (e.g., a non-transitory computer-readable storage medium) storing the computer-readable program instructions.

BRIEF DESCRIPTION OF THE DRAWINGS

The particular features and advantages of the embodiment (s) as well as other objects will become apparent from the following description taken in connection with the accompanying drawings, in which:

FIG. 3 is a block diagram illustrating an example of a machine learning model;

FIG. 11 is a flowchart illustrating a continuation of the process in FIG. 10.

DETAILED DESCRIPTION

A. First Embodiment

A1. Device Configuration

Figure 1:
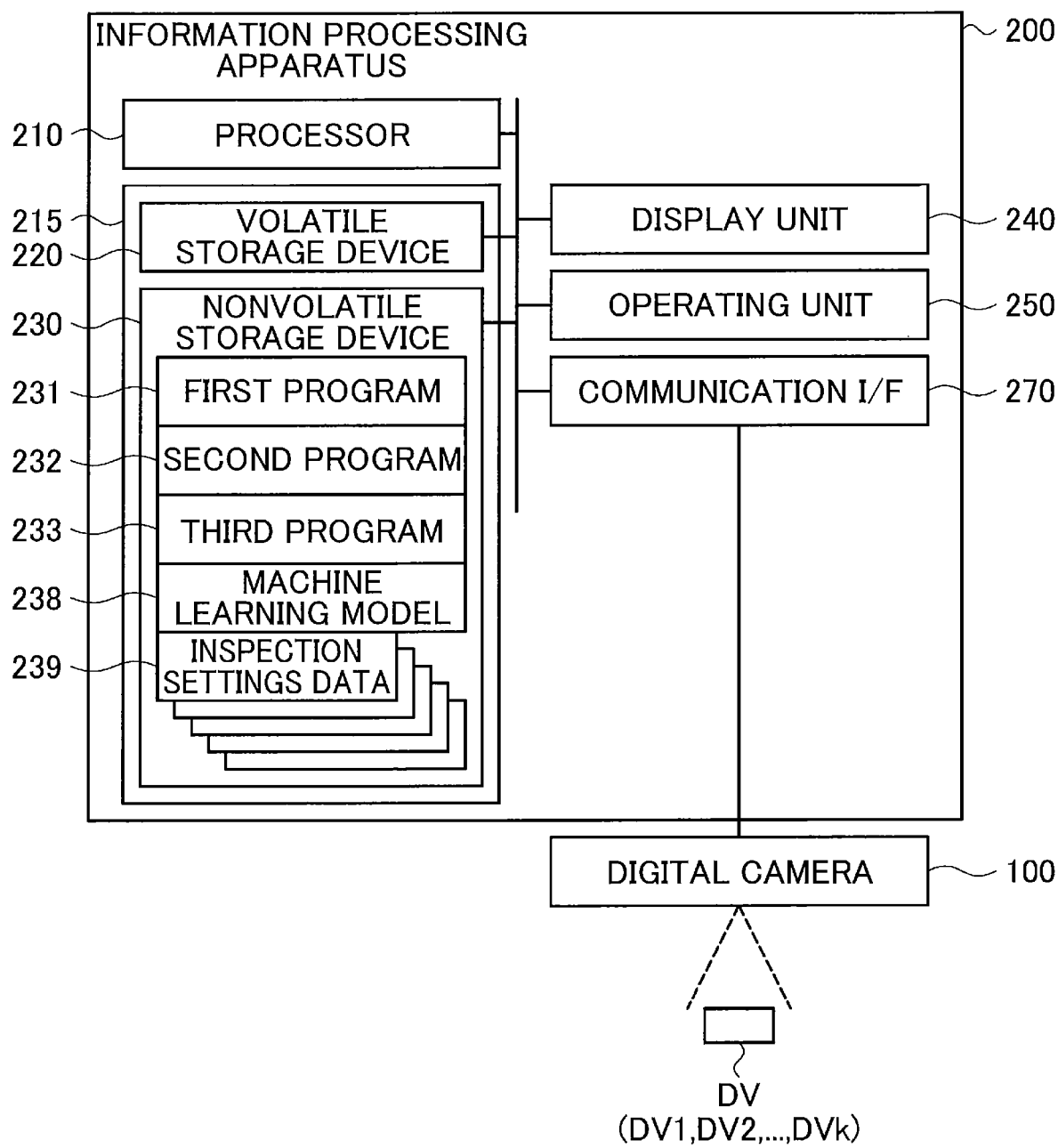
FIG. 1 is a block diagram illustrating an information processing apparatus according to one embodiment.

FIG. 1 is a block diagram showing an information processing apparatus 200 as an example of the information forming system according to one embodiment of the present disclosure. The information processing apparatus 200 according to the embodiment is a personal computer, for example. The information processing apparatus 200 uses photographic images of an object being inspected (a product such as a printer, for example) to determine settings for inspecting the object. The information processing apparatus 200 inspects the object based on the determined settings. The information processing apparatus 200 is provided with a processor 210, a storage device 215, a display unit 240, an operating unit 250, and a communication interface 270. The above components are interconnected via a bus. The storage device 215 includes a volatile storage device 220, and a nonvolatile storage device 230.

The processor 210 is a device configured to perform data processing. The processor 210 is a CPU, for example. The volatile storage device 220 is DRAM, for example. The nonvolatile storage device 230 is flash memory, for example. The nonvolatile storage device 230 stores programs 231, 232, and 233; a machine learning model 238; and a plurality of sets of inspection settings data 239.

The machine learning model 238 is a prediction model that uses photographic images of an object to predict identification information for the object (the model name of the object, for example). In the present embodiment, the machine learning model 238 is a program module. The first program 231 is a program for implementing a training process to train the machine learning model 238. The second program 232 is a program for implementing a process to determine settings for inspecting an object using photographic images of the object. The third program 233 is a program for implementing a process to inspect an object according to determined settings. Each set of inspection settings data 239 specifies settings for inspecting an object. Inspection settings differ according to identification information for the objects. The inspection settings data 239 includes data specifying identification information associated with the inspection settings data 239. The processor 210 temporarily stores various intermediate data used when executing the programs 231-233 in the storage device 215, such as the volatile storage device 220 or nonvolatile storage device 230. The programs 231-233, the machine learning model 238, and the sets of inspection settings data 239 will be described later in greater detail.

The display unit 240 is a device configured to display images, such as a liquid crystal display or an organic light-emitting diode display. The operating unit 250 is a device that accepts user operations, such as a touchscreen arranged over the display unit 240, buttons, levers, and the like. By operating the operating unit 250, the user can input various requests and instructions into the information processing apparatus 200. The communication interface 270 is an interface for communicating with other devices. For example, the communication interface 270 may be a USB interface, a wired LAN interface, or a wireless communication interface conforming to the IEEE 802.11 standard. A digital camera 100 is connected to the communication interface 270. The digital camera 100 is configured to photograph an object DV being inspected and generates photographic image data of the photographed image. In the following description, the object DV will be a printer. Hereinafter, the object DV will be sometimes called the "printer DV"

A2. Photographic Images

Figure 2A:
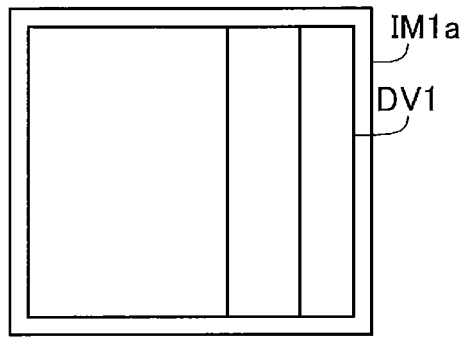
FIGS. 2A-2H are schematic diagrams illustrating examples of photographic images.
Figure 2B:
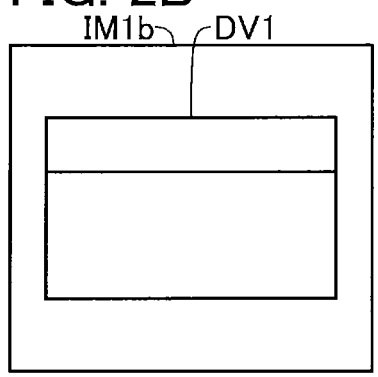
Figure 2C:
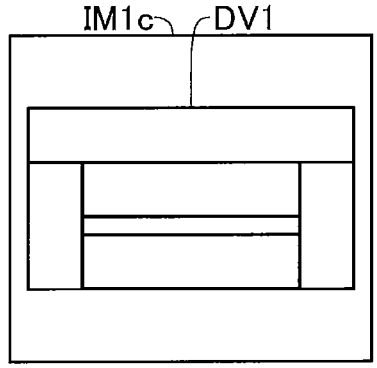
Figure 2D:
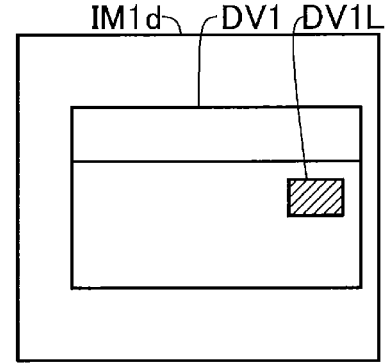
Figure 2E:
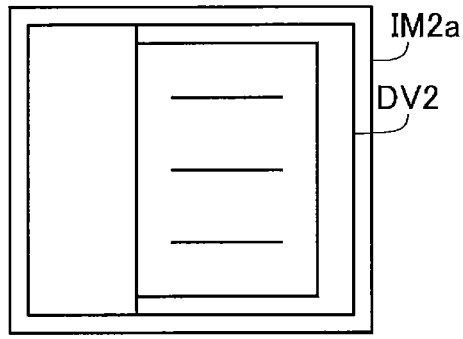
Figure 2F:
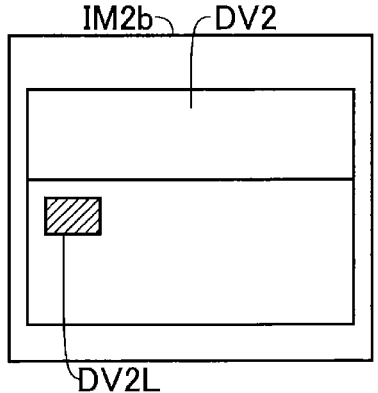
Figure 2G:
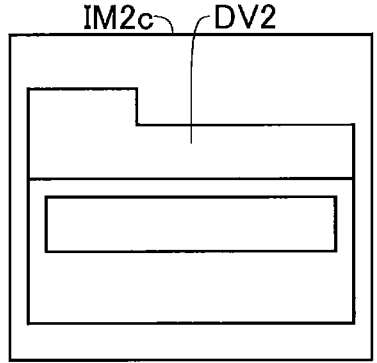
Figure 2H:
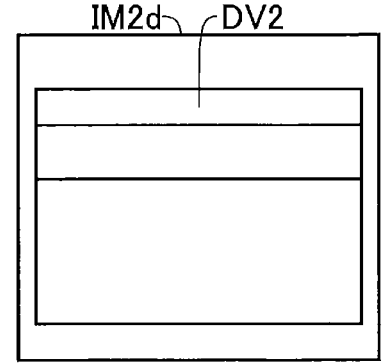

FIGS. 2A-2H are schematic diagrams showing examples of photographic images. FIGS. 2A-2D show photographic images of a first printer DV1, which is an example of the object. Images IM1a-IM1d in FIGS. 2A-2D show the first printer DV1 viewed from different directions, and more specifically show the first printer DV1 in a top view, left-side view, front view, and right-side view, respectively. FIGS. 2E-2H are photographic images of a second printer DV2 having a different model name from the model name of the first printer DV1. In the following description, the model name for the first printer DV1 will be called a first model name, and the model name for the second printer DV2 will be called a second model name. Images IM2a-IM2d in FIGS. 2E-2H show the second printer DV2 in a top view, left-side view, front view, and right-side view, respectively. The external appearance of the first printer DV1 and second printer DV2 differs at least in part since the first printer DV1 and second printer DV2 have different model names. As shown in FIG. 2D, a first label DV1L is affixed to the first printer DV1. As shown in FIG. 2F, a second label DV2L different from the first label DV is affixed to the second printer DV2. As will be described later, the printers DV1 and DV2 are inspected in the present embodiment to determine whether suitable labels DV1L and DV2L are affixed thereto. A suitable label is different for printers having different model names. That is, a suitable label differs depending on the model name of a printer. Each of the printers DV1 and DV2 is an example of the object.

A3. Configuration of the Machine Learning Model

FIG. 3 is a block diagram showing an example of the machine learning model 238. Photographic image data Din representing a photographic image IM of a printer DV is inputted into the machine learning model 238. Images of the printer DV taken from various directions, as in FIGS. 2A-2H, are used as the photographic image IM. The photographic image IM is represented by color values of pixels arranged in a matrix configuration having a first direction Dx, and a second direction Dy orthogonal to the first direction Dx. The photographic image IM has a width W1 and a height H1. The width W1 indicates the number of pixels in the first direction Dx, while the height H1 indicates the number of pixels in the second direction Dy. Each color value in the present embodiment is represented by three component values for red (R), green (G), and blue (B). Thus, the photographic image data Din is bitmap data representing three component values (the R value, G value, and B value) for each of H1×W1 pixels. That is, the photographic image data Din is data representing H1×W1×3 values.

Based on the inputted photographic image data Din, the machine learning model 238 predicts the model name of the printer DV depicted in the photographic image IM. The model name of the printer DV is predicted from k predetermined model names (where k is an integer of 2 or greater). In the present embodiment, the machine learning model 238 outputs confidence data Dout indicating a confidence for each of the k model names from 1 to k. A confidence Pi shown in FIG. 3 represents the confidence for the i-th model name (where i is an integer between 1 and k). The confidence Pi indicates the probability that the model name of the printer DV is the i-th model name. That is, the confidence Pi indicates the extent to which the model name of the printer DV is likely to be the i-th model name.

In the present embodiment, the machine learning model 238 is an artificial neural network called a convolutional neural network (CNN). The machine learning model 238 has a first convolutional layer 510, a first pooling layer 520, a second convolutional layer 530, a second pooling layer 540, a first fully connected layer 550, a second fully connected layer 560, and a third fully connected layer 570. These layers 510-570 are connected in the order given above.

The photographic image data Din is inputted into the convolutional layer 510.

The convolutional layers 510 and 530 each executes a process that includes a convolution process and a bias-adding process on the inputted data. The convolution process is a process for calculating correlation values indicating correlations between inputted data and filters while successively applying s filters with p×q×r dimensions to the data inputted from the preceding layer (where p, q, r, and s are integers of 1 or greater). In the process for applying each filter, a plurality of correlation values is calculated sequentially while sliding the filter over the input data. One filter includes p×q×r weights. The bias-adding process is a process for adding a bias to the calculated correlation values. One bias is prepared for each filter. Normally, the number s and the dimensions (p×q×r) of the filters being used differ between the convolutional layers 510 and 530.

Data generated by the convolutional layers 510 and 530 is inputted into an activation function for conversion, and the converted data is subsequently inputted into the next layer (the respective pooling layers 520 and 540). In the present embodiment, a rectified linear unit (ReLU) is used as the activation function.

The pooling layers 520 and 540 perform max pooling on the data inputted from the preceding convolutional layer to reduce the number of dimensions of the inputted data. Max pooling reduces the number of dimensions through a process called down-sampling in which the largest value within a window of a prescribed size (2×2, for example) is selected while sliding the window by a prescribed stride (2, for example). Data generated by the pooling layers 520 and 540 is inputted without change into the next layer (the respective layers 530 and 550).

Each of the fully connected layers 550, 560, and 570 uses m-dimensional data inputted from the preceding layer (i.e., m values, where m is an integer of 2 or greater) to output n-dimensional data (i.e., n values, where n is an integer of 2 or greater). Each of the outputted n values is obtained by adding a bias to the dot product of the vector configured by the inputted m values and the vector configured by the m weights (dot product+bias). Each of the fully connected layers 550, 560, and 570 outputs n-dimensional data using m×n weights and n biases. Note that the number of dimensions m for the input data and the number of dimensions n for the output data are normally different among the fully connected layers 550, 560, and 570.

Each value generated by the fully connected layers 550 and 560 is inputted into an activation function for conversion, and the converted values are subsequently inputted into the next layer (the respective fully connected layers 560 and 570). A ReLU is used as the activation function, for example.

Data generated by the third fully connected layer 570 (k values) is inputted into an activation function for conversion. Here, a softmax function is used as the activation function. The softmax function normalizes the k values so that the sum of the k values is 1. The range of the normalized values is between 0 and 1. The machine learning model 238 is trained so that the k values converted by the activation function indicate the respective confidence for each of the k model names. Confidence has a correlation with the probability that the corresponding model name is correct. Thus, the confidence data Dout represents the distribution of probabilities among the k model names.

The numerical values provided on the left-lower side of each layer in FIG. 3 (H1×W1×D1, for example) denote the number of dimensions of data inputted into that layer. The numerical values on the left-upper side of each layer (H2× W2×D1, for example) denote the number of dimensions of data outputted from that layer. The data may have a variety of values for the number of dimensions. For example, H1 and W1 may both be 50; D1 may be 8; H2 and W2 may both be 50; D2 may be 16; H3 and W3 may both be 25; D3 may be 512; and D4 may be 64. The number k of model names may be any of various values. For example, k may be any value of 2 or greater, such as 2, 3, or 4.

A4. Training Process

Figure 4:
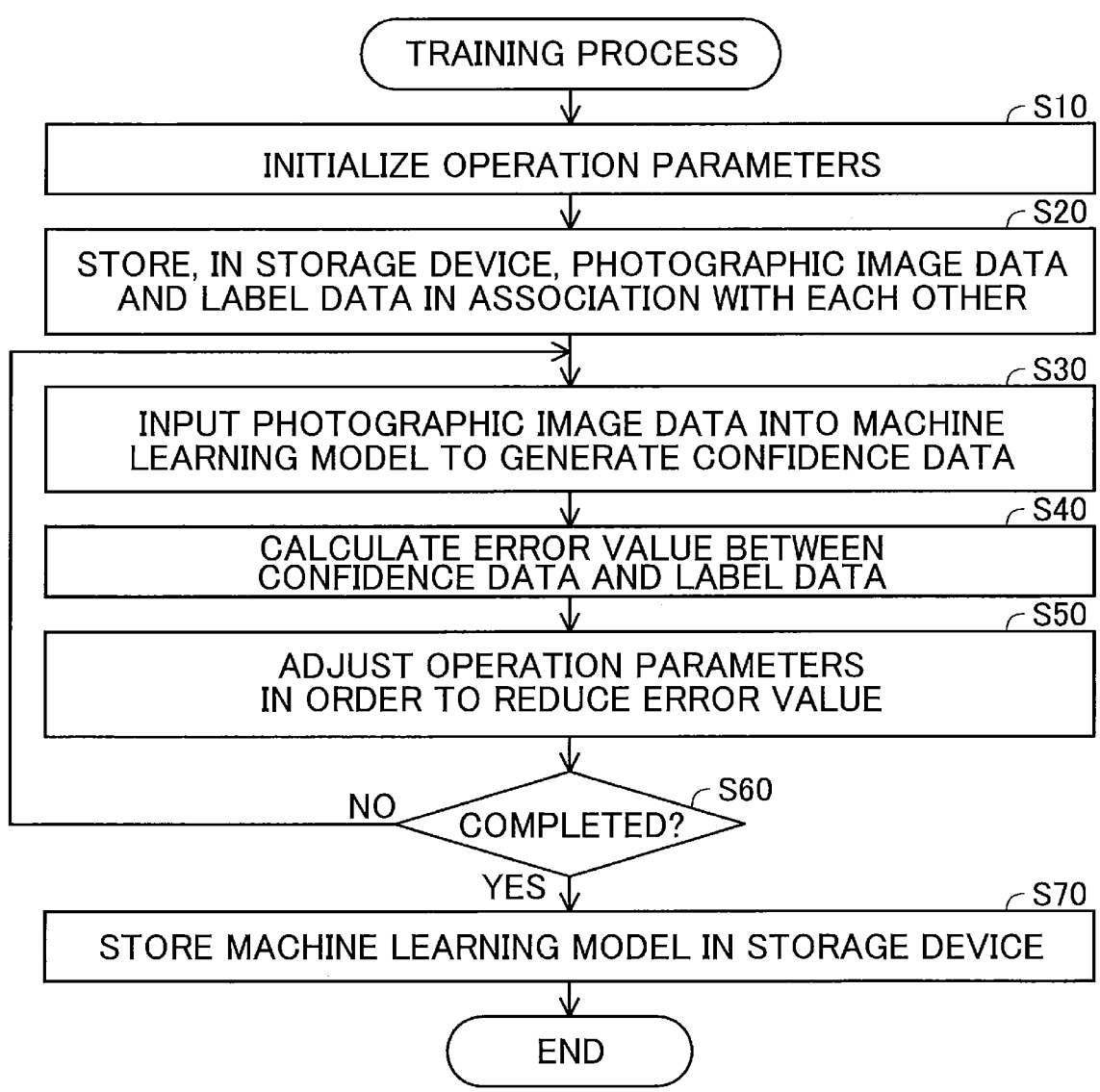
FIG. 4 is a flowchart illustrating an example of a training process.

FIG. 4 is a flowchart showing an example of a training process for the machine learning model 238 (see FIG. 3). The machine learning model 238 is trained in order to increase a confidence for the model name of the printer DV depicted in photographic images IM. This training adjusts the plurality of operation parameters used in operations by each of the layers 510-570 (the pluralities of weights and biases for the plurality of filters in the convolutional layers 510 and 530 and the pluralities of weights and biases in the fully connected layers 550, 560, and 570, for example). The processor 210 performs the training process according to the first program 231.

In S10 of FIG. 4, the processor 210 initializes the operation parameters for the machine learning model 238. For example, each operation parameter is set to a random value.

In S20 the processor 210 generates training datasets. First, the operator photographs the printer using the digital camera 100, whereby the digital camera 100 generates photographic image data. In the present embodiment, the operator photographs printers having k different model names. As described in FIGS. 2A-2H, the operator photographs each printer from various directions, whereby the digital camera 100 generates a plurality of sets of photographic image data for each printer. A large quantity of photographic image data is generated for each of the k model names in order to achieve suitable training. For example, each printer may be photographed a plurality of times. Further, a plurality of printers having the same model name may be photographed.

The processor 210 acquires the photographic image data from the digital camera 100. The processor 210 also prompts the operator to input model name information specifying the model names corresponding to the photographic image data. The model name is an example of the identification information that identifies the printer. Next, the processor 210 stores, in the storage device 215 (the nonvolatile storage device 230, for example), the photographic image data and data indicating the model name information corresponding to the photographic image data (also called label data or supervised data) in association with each other. In the present embodiment, the label data specifies the target values of the confidence data Dout. In other words, the label data specifies correct solutions. Specifically, the confidence for the model name corresponding to the model name information is 1, and the confidences for the other model names are 0. Hereinafter, the associated photographic image data and label data will be collectively referred to as the training data. Further, a plurality of sets of training data will be collectively called the training datasets.

Note that a plurality of sets of photographic image data may be added according to a technique called data augmentation. Further, the process of generating the photographic image data and inputting the model name information (and hence step S20) may be performed prior to the start of the training process.

In S30 the processor 210 selects V sets of training data from the training datasets stored in the storage device 215 (where V is an integer of 1 or greater), and inputs V sets of photographic image data acquired from the V sets of training data into the machine learning model 238 to generate V sets of confidence data Dout. The processor 210 performs a computation based on the operation parameters in the machine learning model 238 using one set of photographic image data in order to calculate the confidence data Dout corresponding to that photographic image data. The processor 210 calculates the confidence data Dout for each of the V sets of photographic image data. Unused training data may be selected from the training datasets in S30 as the V sets of training data. Alternatively, the V sets of training data may be selected randomly from the training datasets.

In S40 the processor 210 calculates an error value indicating the difference between the confidence data Dout and the label data associated with the photographic image data used for generating the confidence data Dout. The error value is calculated based on a predetermined loss function.

(Such an error value is also called a loss value.) In the present embodiment, cross entropy is used as the loss function. Cross entropy can be used as an index value specifying the divergence between two probability distributions (such as the confidence data Dout and the label data). In S40 the processor 210 calculates V error values. Note that various other functions may be used as the loss function, such as the sum of squared error.

In S50 the processor 210 adjusts the operation parameters in the machine learning model 238 based on the V error values. Specifically, the processor 210 adjusts the operation parameters according to a prescribed algorithm in order to reduce the error values, i.e., to reduce the difference between the confidence data Dout and the label data. For example, the operation parameters are adjusted to reduce an index value calculated using the V error values (any of various values having a correlation with the magnitude of difference, such as the mean, maximum, median, or sum). A prescribed algorithm used in S50 may be an algorithm used in the error backpropagation method or the gradient descent method, for example.

In S60 the processor 210 determines whether training is complete. The condition for training to be complete may be any of various conditions. In the present embodiment, the processor 210 inputs a plurality of sets of photographic image data Din for evaluation from among the training datasets into the machine learning model 238 to generate a plurality of sets of confidence data Dout for evaluation. Here, the sets of photographic image data Din for evaluation differ from the sets of photographic image data Din that have been used for training. The processor 210 determines that training is complete on the condition that the error values obtained from the sets of confidence data Dout for evaluation are small (for example, when the mean error value is no greater than a prescribed reference value).

If training is not complete (S60: NO), the processor 210 returns to S30 and continues the training process. Once training is complete (S60: YES), in S70 the processor 210 stores the machine learning model 238 that includes the adjusted operation parameters in the storage device 215 (the nonvolatile storage device 230 in this case) as a trained model. Subsequently, the processor 210 ends the process of FIG. 4.

The trained machine learning model 238 can predict an appropriate model name for photographic images photographed from various directions. As an example, the images in FIGS. 2A-2H may be used for training. When photographic image data for the first printer DV1 is inputted into the machine learning model 238, the confidence for the first model name becomes near 1 while the confidence for other model names becomes near 0. Here, the direction that the first printer DV1 is photographed may be various direction. Similarly, when photographic image data for the second printer DV2 is inputted into the machine learning model 238, the confidence for the second model name becomes near 1 while the confidence for other model names becomes near 0. Here as well, the direction that the second printer DV2 is photographed may be various directions. In this way, the model name associated with the highest confidence can be adopted as the predicted model name for the printer in the photographic images.

However, in some cases the difference between the k confidences may be small (i.e., each of the k confidences may be small). This may occur in one of the following cases, for example: (1) when the photographic images are defective (for example, when the printer appears blurred in the photographic images), and (2) when printers having different model names from each other have a portion that is similar in appearance. In such cases, the precision for predicting the model name based solely on a single photographic image may be low. As is described later, a plurality of photographic images is used in the present embodiment to improve the precision in predicting model names.

A5. Inspection Process

Figure 5:
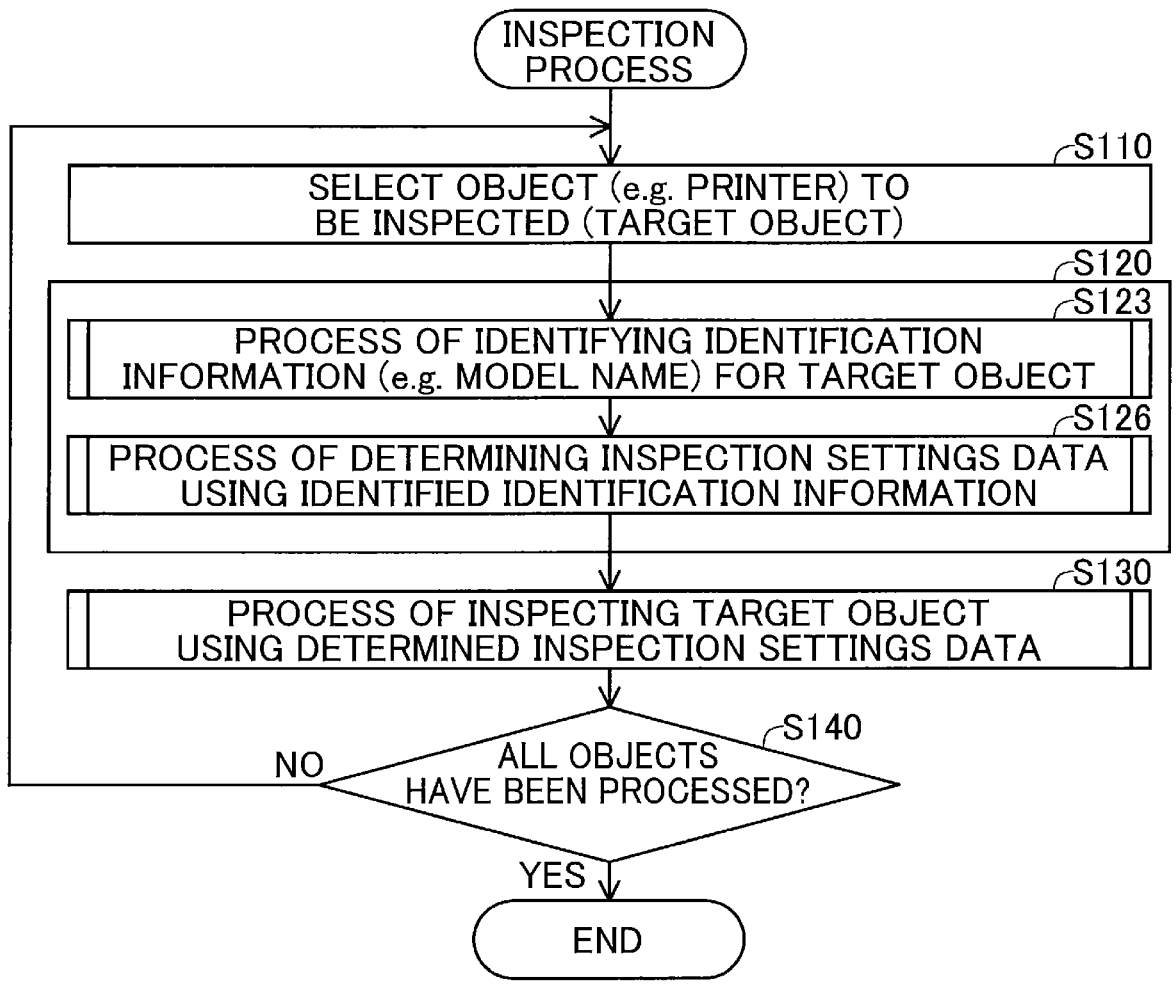
FIG. 5 is a flowchart illustrating an example of an inspection process for inspecting an object.

FIG. 5 is a flowchart showing an example of an inspection process for inspecting an object. In the present embodiment, a printer is inspected to determine whether a suitable label is affixed thereto. The suitable label is different for each model name. For example, a first label DV1L is affixed to the first printer DV1 (FIG. 2D), while a second label DV2L that differs from the first label DV1L is affixed to the second printer DV2 (FIG. 2F). Label image data representing an image of a suitable label is used in the present embodiment when inspecting a printer to determine whether the printer has a label associated with the model name of the printer. Label image data is prepared for each model name. Each set of inspection settings data 239 in the present embodiment (FIG. 1) includes this label image data.

Further, printers of each of the k model names are inspected according to a common inspection process in the present embodiment. That is, k types of printers corresponding one-to-one with the k model names are inspected according to a common inspection process in the present embodiment. For example, printers of each of the k model names (i.e., the k types of printers) are inspected on a single production line in the printers' manufacturing plant. However, the settings used for inspection (the inspection settings data 239 representing images of a suitable label in the present embodiment) differ for each model name. Thus, the processor 210 identifies the model name of the printer being inspected using photographic images of the printer, sets the inspection settings data 239 to be used for inspection based on the identified model name, and inspects the printer based on this inspection settings data 239.

The inspection process in FIG. 5 includes four steps S110, S120, S130, and S140. The processor 210 executes step S130 of the inspection process according to the third program 233, and executes all other steps S110, S120, and S140 according to the second program 232.

In S110 the processor 210 selects one of a plurality of printers (i.e., a plurality of objects) as a target printer. Here, the target printer is a printer to be subjected to the inspection process. The target printer is selected from among uninspected printers. For example, the processor 210 may select the printer sequentially following the last printer inspected on the production line to be the target printer.

In S120 the processor 210 executes an identification process in S123 and a setting process in S126. In S123 the processor 210 identifies the model name (i.e., the identification information) of the target printer. In S126, based on the model name identified in S123, the processor 210 sets inspection settings to be used when inspecting the target printer.

Figure 6:
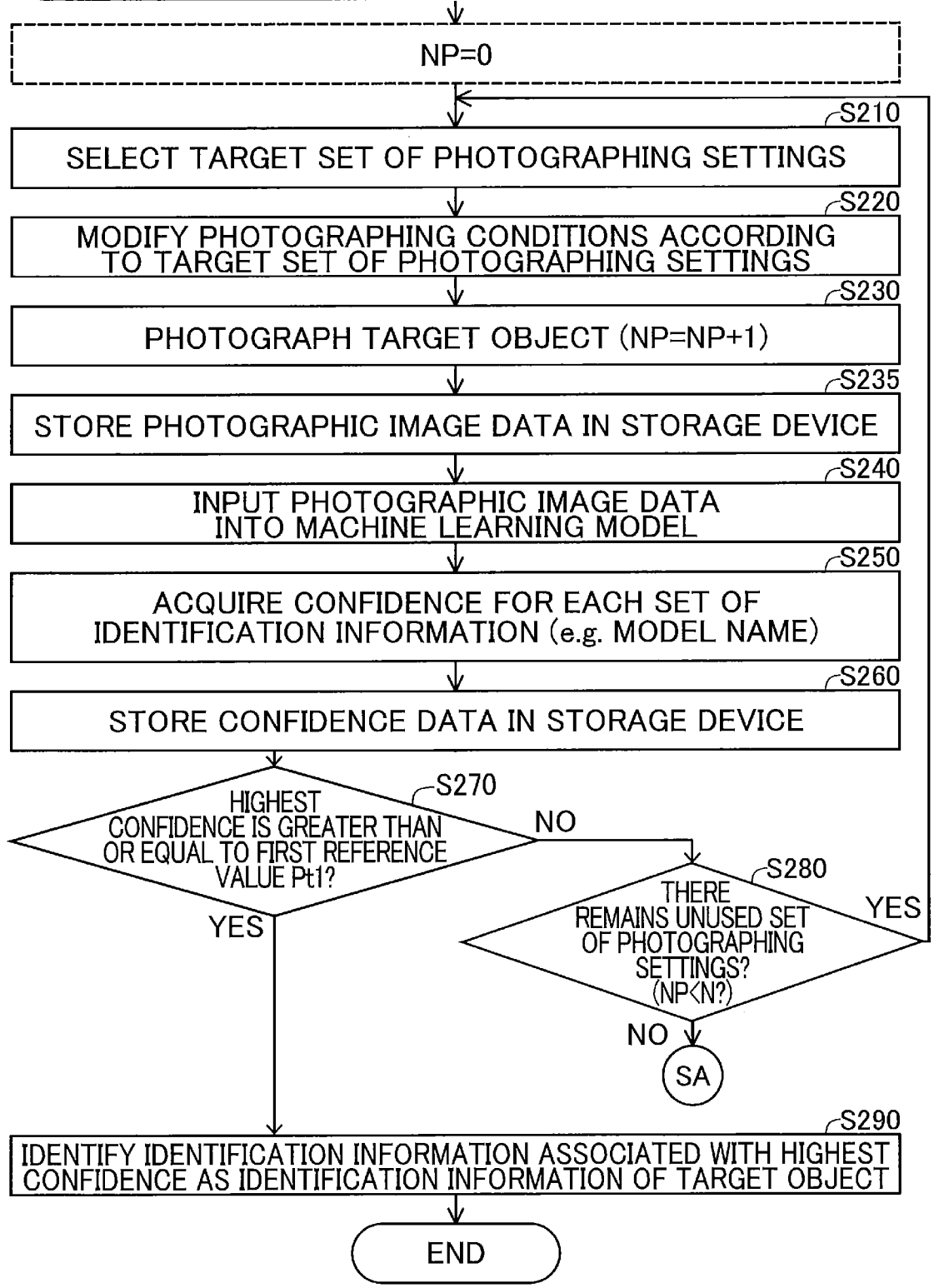
FIG. 6 is a flowchart illustrating an example of a process of identifying the identification information of a target printer.
Figure 7:
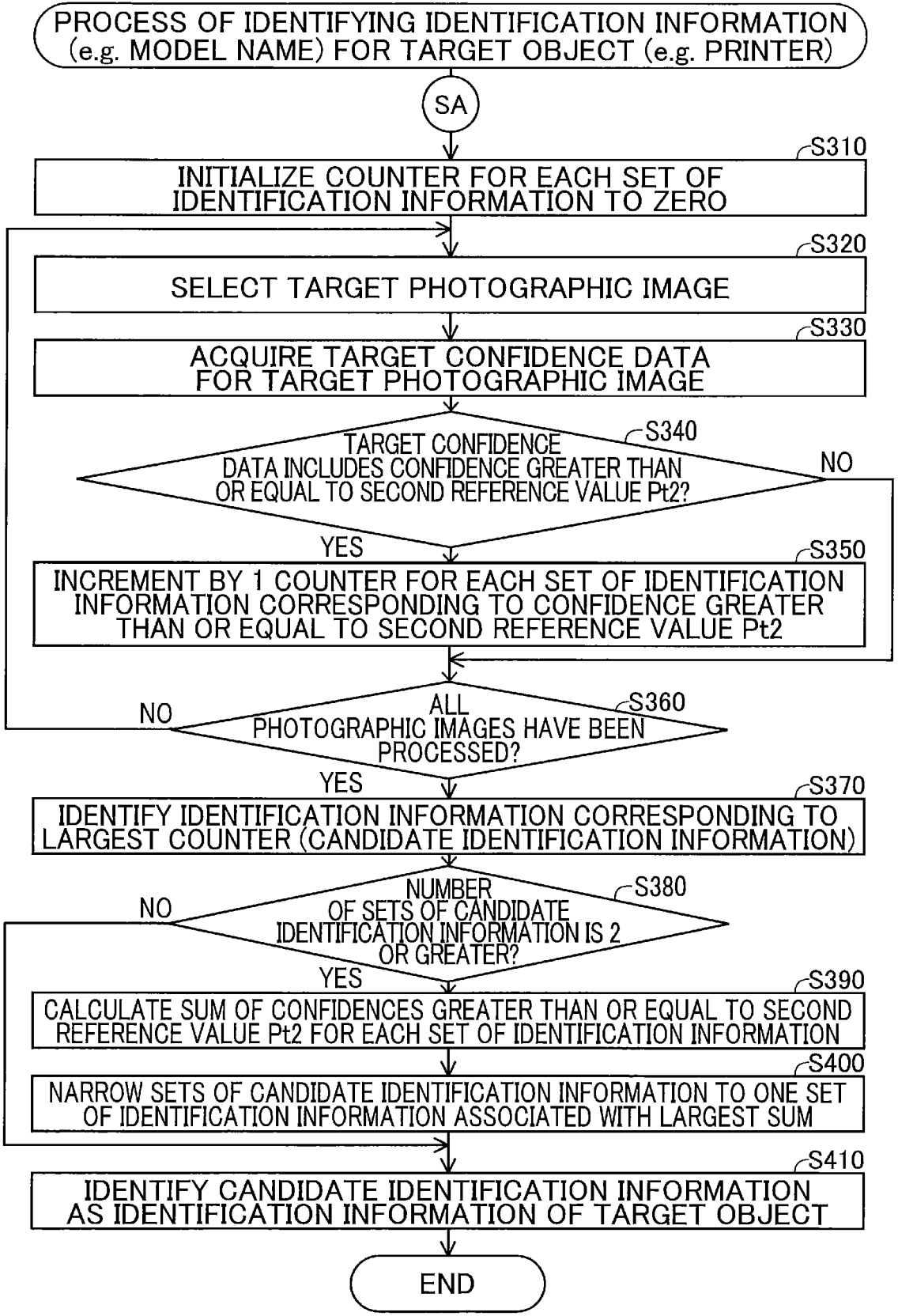
FIG. 7 is a flowchart illustrating a continuation of the process in FIG. 6.

FIGS. 6 and 7 are flowcharts showing an example of the identification process of S123, i.e., the process for identifying the model name of the target printer. FIG. 7 is a continuation of the process in FIG. 6. In the present embodiment, photographic images of the target printer are used for identifying the model name of the target printer. As described in FIGS. 2A-2H, the target printer is photographed from various directions (hereinafter called the photographing directions). In the present embodiment, N sets of photographing settings (where N is an integer of 2 or greater) are available. Each of the N sets of photographing settings includes a different photographing direction from each other. For example, four photographing directions, such as those shown in FIGS. 2A-2D, may be available. When the photographic images are taken from different photographing directions, each of the images includes an image of a different portion of the printer. A photograph number NP in the flowchart of FIG. 6 denotes the total number of sets of photographing settings used in photographing the target printer. NP is 0 at the beginning of the process in FIG. 6.

In S210 the processor 210 selects one of the unused sets of photographing settings from among the N sets of photographing settings to be a target set of photographing settings. In S220 conditions for photographing are modified according to the target set of photographing settings. For example, the user moves the digital camera 100 to a position corresponding to the photographing direction determined by the target set of photographing settings. Alternatively, N digital cameras 100 may be prearranged at N positions corresponding to the N sets of photographing settings. In this case, in S220 the processor 210 may select the digital camera 100 corresponding to the target set of photographing settings as the digital camera to be used for photographing.

In S230 the processor 210 provides a photograph command to the digital camera 100. In response to the command, the digital camera 100 photographs the target printer and generates photographic image data. As a consequence, the processor 210 increments the photograph number NP by 1 and acquires the photographic image data from the digital camera 100. In S235 the processor 210 stores the acquired photographic image data in the storage device 215 (the nonvolatile storage device 230, for example).

In S240 the processor 210 inputs the photographic image data into the trained machine learning model 238 (see FIG. 3) and executes a computation based on the machine learning model 238. In S250 the processor 210 acquires the confidence data Dout resulting from the computation based on the machine learning model 238. The confidence data Dout indicates the confidence for each of the k model names. In S260 the processor 210 stores the confidence data Dout in the storage device 215 (the nonvolatile storage device 230, for example).

In S270 the processor 210 determines whether the highest confidence among the k confidences is greater than or equal to a first reference value Pt1. If the highest confidence is greater than or equal to the first reference value Pt1 (S270: YES), in S290 the processor 210 identifies the model name associated with the highest confidence as the model name of the target printer and subsequently ends the process of FIGS. 6 and 7. The first reference value Pt1 is set in advance through experimentation so that the precision for identifying a model name based on a confidence greater than or equal to the first reference value Pt1 is sufficiently high (Pt1=0.95, for example).

If the highest confidence is less than the first reference value Pt1 (S270: NO), in S280 the processor 210 determines whether any unused sets of photographing settings remain in the N sets of photographing settings. When even one unused set of photographing settings remains (S280: YES), the processor 210 returns to S210 and executes the above process based on an unused set of photographing settings. Note that NP<N when even one unused set of photographing settings remains.

If the highest confidence is less than the first reference value Pt1 for all of the N sets of photographing settings (S270: NO, S280: NO), the processor 210 advances to S310 of FIG. 7 to identify the model name using the N sets of confidence data Dout.

In S310 the processor 210 initializes a counter for each of the N model names to 0. As will be described later, the counters are used for counting the number of times that a high confidence has been obtained.

In S320 the processor 210 selects one of the unused photographic images from the N photographic images to be used as a target photographic image. In S330 the processor 210 acquires target confidence data from the storage device 215. The target confidence data is confidence data associated with the target photographic image. N sets of confidence data correlated with the N photographic images has been stored in the storage device 215 in S260 of FIG. 6.

In S340 the processor 210 determines whether the k confidences in the target confidence data include one or more confidences greater than or equal to a second reference value Pt2. If the k confidences in the target confidence data include one or more confidences greater than or equal to the second reference value Pt2 (S340: YES), in S350 the processor 210 increments by 1 the counters for model names corresponding to the one or more confidences greater than or equal to the second reference value Pt2. Subsequently, the processor 210 advances to S360. However, if the processor 210 determines in S340 that the k confidences in the target confidence data does not include even one confidence greater than or equal to the second reference value Pt2 (S340: NO), the processor 210 skips S350 and advances directly to S360. The second reference value Pt2 is set in advance through experimentation so that a suitable candidate for the model name can be found using the number of times a confidence greater than or equal to the second reference value Pt2 is obtained. This second reference value Pt2 is smaller than the first reference value Pt1 (Pt2=0.6, for example).

In S360 the processor 210 determines whether all of the N photographic images have been processed. If there remain unprocessed photographic images (S360: NO), the processor 210 returns to S320 and repeats the above process on an unprocessed photographic image.

When all of the N photographic images have been processed (S360: YES), in S370 the processor 210 identifies the largest of the k counters corresponding to the k model names. Next, the processor 210 identifies the model name corresponding to the largest counter as the candidate model name. In the present embodiment, the second reference value Pt2 is set so that one or more model names are identified as candidate model names under certain circumstances. In other words, counters corresponding to one or more model names may be greater than or equal to 1. Additionally, counters for a plurality of model names may have the same maximum value. In these cases, a plurality of model names is identified as candidate model names.

In S380 the processor 210 determines whether the number of candidate model names is 2 or greater. If the number of candidate model names is less than 2, the number of candidate model names is 1 in the present embodiment (S380: NO). In this case, the processor 210 advances to S410, identifies the candidate model name as the model name of the target printer, and ends the process in FIGS. 6 and 7.

However, if the number of candidate model names is 2 or greater (S380: YES), in S390 the processor 210 calculates the sum of confidences greater than or equal to the second reference value Pt2 for each model name. In S400 the processor 210 sets the candidate model name to the single model name corresponding to the largest sum calculated in S390 (i.e., narrows the number of candidates to one model name associated with the largest sum). Next, in S410 the processor 210 identifies the candidate model name (i.e., the candidate model name set to the model name in S400) as the model name of the target printer and subsequently ends the process of FIGS. 6 and 7.

Hereinafter, the model name identified in S410 (i.e., the model name of the target printer) will be sometimes called the target model name.

After completing the process in FIGS. 6 and 7 and, hence, S123 of FIG. 5, in S126 the processor 210 sets the inspection settings data 239 to be used for inspection based on the target model name. As described above, the inspection settings data 239 in the present embodiment includes data representing a label image associated with the model name.

Figure 8:
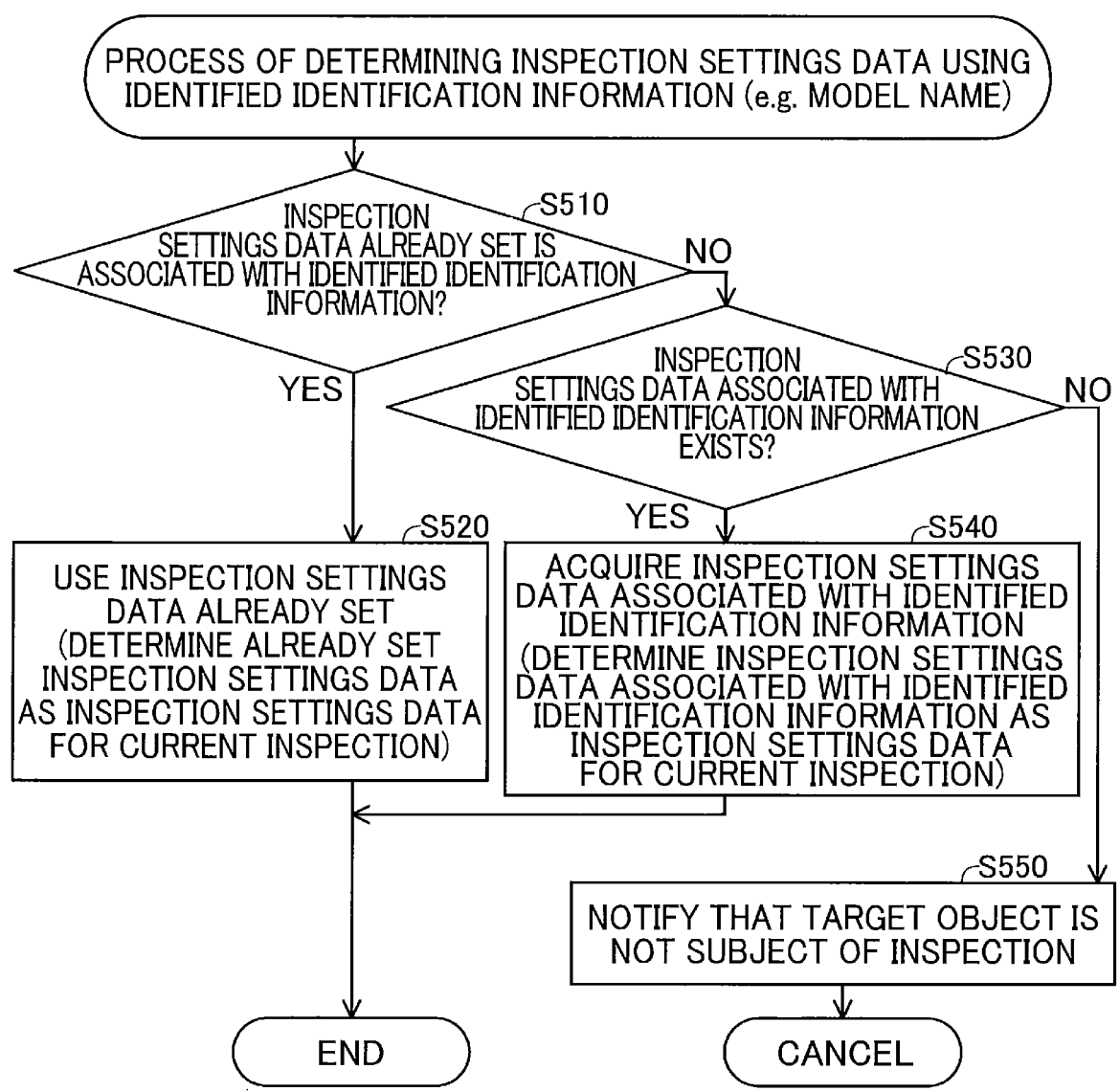
FIG. 8 is a flowchart illustrating an example of a process of determining inspection settings data.

FIG. 8 is a flowchart showing an example of a process for setting the inspection settings data 239. In S510 of FIG. 8, the processor 210 determines whether the current inspection settings data 239 is associated with the target model name. The current inspection settings data 239 is the inspection settings data 239 used in the previous inspection and, hence, has already been acquired. If the current inspection settings data 239 is associated with the target model name (S510: YES), in S520 the processor 210 leaves the current inspection settings data 239 set as the inspection settings data 239 to be used for the current inspection, and subsequently ends the process of FIG. 8.

However, when the current inspection settings data 239 differs from that associated with the target model name, i.e., the model name of the target printer (S510: NO), the processor 210 advances to S530. When the current inspection is the first inspection, current inspection settings data has not yet been acquired. In this case, the processor 210 reaches a NO determination in S510. In S530 the processor 210 references the plurality of sets of inspection settings data 239 stored in the nonvolatile storage device 230 (see FIG. 1) to determine whether inspection settings data 239 associated with the target model name exists in the plurality of sets of inspection settings data 239 stored in the nonvolatile storage device 230.

When the processor 210 finds inspection settings data associated with the target model name (S530: YES), in S540 the processor 210 acquires the inspection settings data 239 associated with the target model name and sets this inspection settings data 239 as the inspection settings data to be used in the current inspection. Subsequently, the processor 210 ends the process in FIG. 8.

In the following description, data among the plurality of sets of inspection settings data 239 set as the inspection settings data to be used in the current inspection (i.e., the inspection settings data 239 associated with the model name of the target printer) will be called the target inspection settings data 239.

If the processor 210 finds no inspection settings data associated with the target model name (S530: NO), in S550 the processor 210 notifies the operator that the target printer is not a subject of inspection and cancels the inspection process. Here, any method of notification may be used. For example, the processor 210 may display a warning message on the display unit 240. The processor 210 may also output a warning sound from a speaker (not shown).

Figure 9:
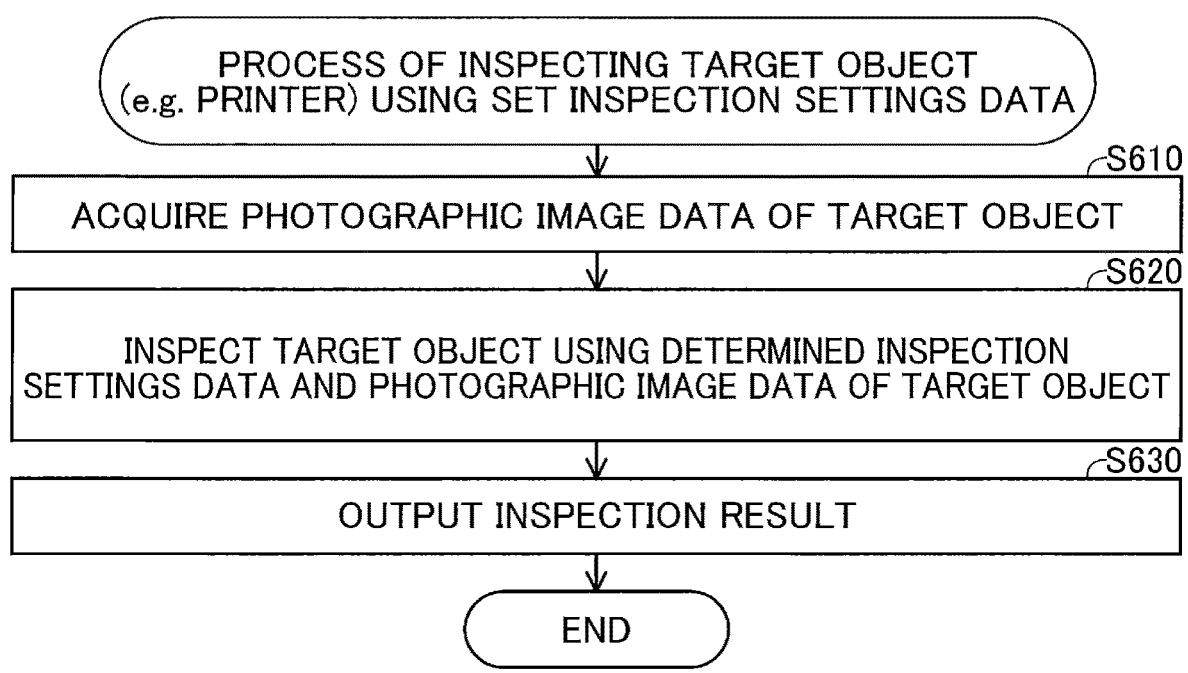
FIG. 9 is a flowchart illustrating an example of a process of inspecting the target printer.

After completing the process of FIG. 8 (i.e., S126 of FIG. 5), in S130 the processor 210 executes an inspection process to inspect the target printer using the target inspection settings data 239. FIG. 9 is a flowchart showing an example of a process of inspecting the target printer. In S610 of FIG. 9, the processor 210 acquires photographic image data of the target printer. The process of S610 in the present embodiment is performed similarly to steps S220, S230, and S235 of FIG. 6. Here, the digital camera 100 is used to photograph the outer surface of the target printer on which the label should be affixed. The processor 210 acquires the photographic image data from the digital camera 100.

In S620 the processor 210 inspects the target printer using the target inspection settings data 239 and the photographic image data of the target printer. In the present embodiment, the processor 210 uses pattern matching on the label images specified by the target inspection settings data 239 and the photographic images to detect the label image in the photographic images. The inspection result is "pass" when a label image is detected and "fail" when a label image is not detected.

In S630 the processor 210 outputs the inspection result. Subsequently, the processor 210 ends the process of FIG. 9 (i.e., S130 of FIG. 5). Any method may be used to output the inspection result. For example, the processor 210 may output inspection results data specifying the inspection result to a storage device, such as the nonvolatile storage device 230 or an external storage device (not shown) connected to the information processing apparatus 200, thereby storing the inspection results data in the storage device. Alternatively, the processor 210 may output image data representing the inspection result to the display unit 240, thereby displaying the inspection result on the display unit 240.

After completing S130 of FIG. 5, in S140 the processor 210 determines whether processing has been completed for all printers. When there remain unprocessed printers (S140: NO), the processor 210 returns to S110 and repeats the process described above for an unprocessed printer. Once all printers have been processed (S140: YES), the processor 210 ends the process of FIG. 5.

In the present embodiment described above, the processor 210 identifies the model name of a printer, where the model name is an example of the identification information. Specifically, the processor 210 identifies the model name in S123 of FIG. 5 (and specifically the process in FIGS. 6 and 7) by inputting photographic image data Din into the machine learning model 238. The photographic image data Din represents photographic images of a printer DV, which is an example of the object. In S126 of FIG. 5 (and specifically the process of FIG. 8), the processor 210 sets inspection settings data 239 for inspecting the printer based on the identified model name. Therefore, the processor 210 can set settings for inspecting the printer to suitable settings to the model name of that printer. The information processing apparatus 200 provided with the processor 210 is an example of the information processing system for inspecting objects.

As described in FIGS. 6 and 7, the processor 210 has a multiple-image mode as an operating mode for identifying the model name of a printer. In the multiple-image mode, the processor 210 inputs a plurality of sets of photographic image data representing a plurality of photographic images taken of the printer into the machine learning model 238 to identify the model name of the printer. Specifically, when the highest confidence obtained from the initially processed photographic image data is less than the first reference value Pt1 (S270: NO), the processor 210 identifies the model name in the multiple-image mode. In the multiple-image mode, a plurality of sets of photographic image data representing a plurality of photographic images is used for identifying the model name of the printer, thereby reducing the potential for misidentifying the model name.

As described in relation to the photographing settings in FIG. 6, the plurality of photographic images represented by the sets of photographic image data include images of different parts of the printer (as in the examples of FIGS. 2A-2D). Thus, in the multiple-image mode, a plurality of photographic images including images of different parts of the printer are used for identifying the model name of the printer, thereby reducing the potential for misidentifying the model name. Even when printers of a plurality of model names have parts that are similar in appearance, for example, this method reduces the potential for misidentifying the model name of the printer since the method uses photographic images that also include images of non-similar parts.

As described in FIG. 4, the machine learning model 238 is configured to output a confidence for each of a plurality of model names based on inputted image data. As described in FIGS. 6 and 7, the processor 210 executes an acquisition process (S240-S250) to acquire one confidence for each model name by inputting one set of photographic image data into the machine learning model 238. When the highest confidence among the plurality of confidences acquired in this process is greater than or equal to the predetermined first reference value Pt1 (S270: YES), the processor 210 identifies the model name associated with the highest confidence to be the model name of the printer (S290). While a highest confidence greater than or equal to the first reference value Pt1 has not been acquired (S270: NO), the processor 210 repeats, as the multiple-image mode, this acquisition process (S240-S250) up to N times (S280: YES; where N is an integer of 2 or greater) until a highest confidence greater than or equal to the first reference value Pt1 is acquired. If a highest confidence greater than or equal to the first reference value Pt1 is not acquired after performing the acquisition process N times (S270: NO, S280: NO), the processor 210 identifies the model name of the printer (FIG. 7) based on the plurality of confidences acquired in the N acquisition processes (S240-S250).

As described above, the processor 210 can reduce the likelihood of misidentifying a model name by identifying the model name associated with the highest confidence as the model name of the printer when the highest confidence acquired is greater than or equal to the first reference value Pt1. If a highest confidence greater than or equal to the first reference value Pt1 is not acquired after performing the acquisition process N times, the processor 210 identifies the model name of the printer using the plurality of confidences acquired through the N acquisition processes, thereby reducing the potential for misidentifying the model name.

Further, if a highest confidence greater than or equal to the first reference value Pt1 is not acquired through the N acquisition processes (S280 of FIG. 6: NO), as described in FIG. 7 the processor 210 identifies the model name of the printer to be the model name having the largest number of times a confidence greater than or equal to the second reference value Pt2 is acquired (S370, S380: NO, S410), where the second reference value Pt2 is smaller than the first reference value Pt1. Hence, the processor 210 can reduce the probability of misidentifying the model name.

B. Second Embodiment

Figure 10:
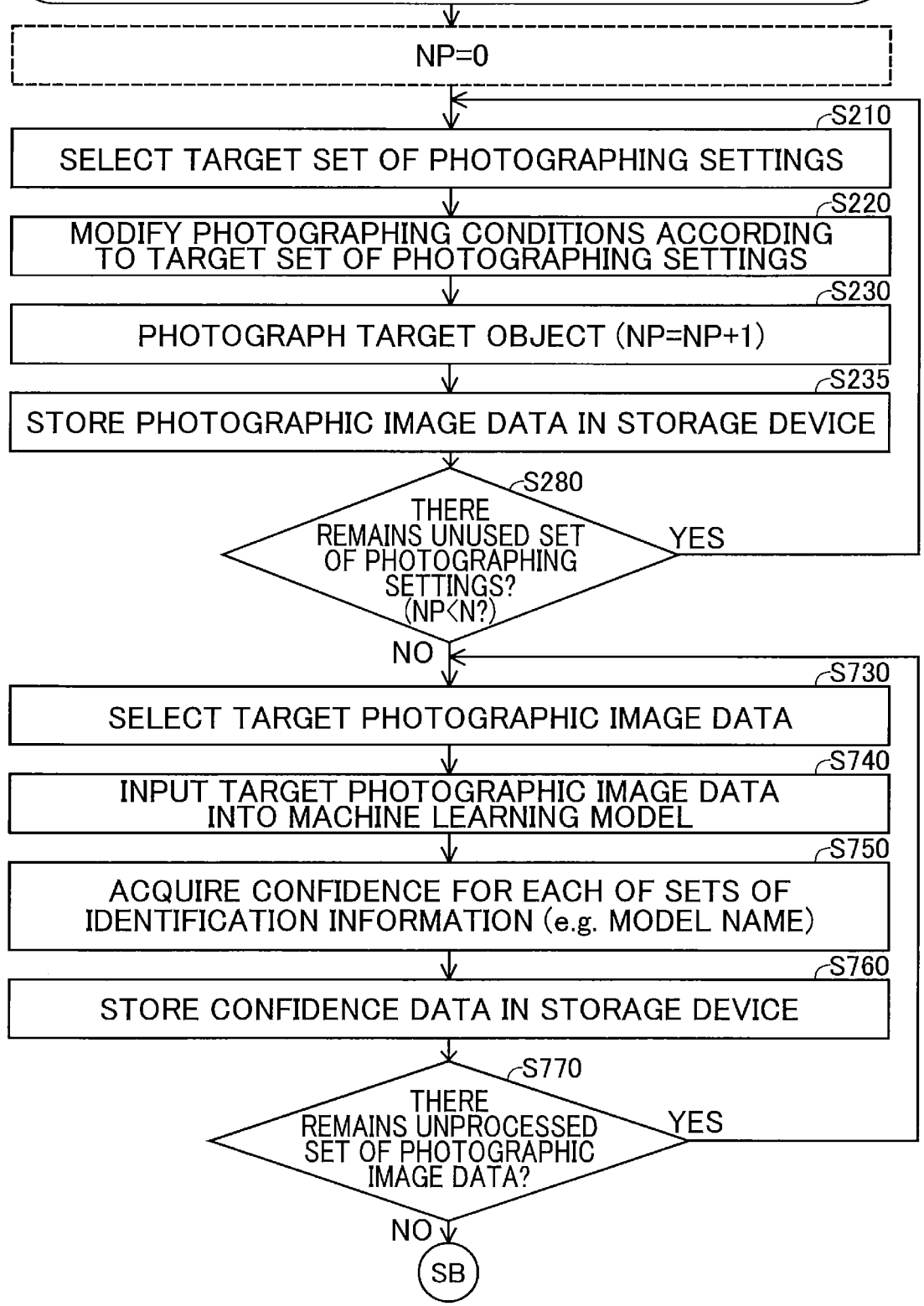
FIG. 10 is a flowchart illustrating another example of the process of identifying the identification information of a target printer.

FIGS. 10 and 11 are flowcharts showing a process for identifying the model name of a target printer according to a second embodiment. The process in FIGS. 10 and 11 is executed in place of the process in FIGS. 6 and 7 for S123 of FIG. 5. The remaining steps of the inspection process (FIG. 5) are identical to those in the process according to the first embodiment. The information processing apparatus that executes this inspection process has the same configuration as the information processing apparatus 200 in FIG. 1.

Unlike in the process of FIGS. 6 and 7 according to the first embodiment, in the process according to the second embodiment the processor 210 acquires a set of confidence data Dout for each of L sets of photographic image data (where L is an integer of 2 or greater), irrespective of the highest confidence. The processor 210 subsequently identifies the model name based on the L sets of confidence data Dout. L denotes the number of sets of photographing settings that include different photographing directions. The L sets of photographing settings may be identical to the N sets of photographing settings used in FIGS. 6 and 7 of the first embodiment.

Steps S210, S220, S230, and S235 in FIG. 10 are identical to the same steps in FIG. 6. Step S280 is also identical to S280 in FIG. 6. When any unused set of photographing settings remains (S280: YES), the processor 210 returns to S210 and executes the above process on an unused set of photographing settings.

Once L sets of photographic image data have been acquired based on the L photographing settings (S280: NO), in S730 the processor 210 selects one unprocessed set of photographic image data from the L sets of photographic image data to be target photographic image data. The subsequent steps S740, S750, and S760 are identical to S240, S250, and S260 in FIG. 6, except that the target photographic image data selected in S730 is used as the photographic image data.

In S770 the processor 210 determines whether all L sets of photographic image data have been processed. When there remains any unprocessed set of photographic image data (S770: YES), the processor 210 returns to S730 and repeats the above process on unprocessed photographic image data.

Once all L sets of photographic image data have been processed (S770: NO), the processor 210 advances to S810 of FIG. 11. Steps S810, S820, and S830 are identical to steps S310, S320, and S330 of FIG. 7, respectively. In S840 the processor 210 determines whether the highest confidence among the k confidences in the target confidence data is greater than or equal to a third reference value Pt3. If the highest confidence is greater than or equal to the third reference value Pt3 (S840: YES), in S850 the processor 210 increments the counter for the model name corresponding to the highest confidence by 1 and advances to S860. If the highest confidence is less than the third reference value Pt3 (S840: NO), the processor 210 skips S850 and advances directly to S860.

The third reference value Pt3 is set in advance through experimentation so that the number of times a highest confidence greater than or equal to the third reference value Pt3 is obtained can be used to find a suitable candidate for the model name (Pt3=0.9, for example).

In S860 the processor 210 determines whether all L photographic images have been processed. If there remain unprocessed photographic images (S860: NO), the processor 210 returns to S820 and repeats the above process on an unprocessed photographic image.

When all of the L photographic images have been processed (S860: YES), the processor 210 advances to S870. Steps S870, S880, S890, S900, and S910 are identical respectively to steps S370, S380, S390, S400, and S410 of FIG. 7, except that the third reference value Pt3 is used in place of the second reference value Pt2 in S890. That is, in S870 the processor 210 identifies the model name corresponding to the largest counter as the candidate model name.

If the number of candidate model names is 1 (S880: NO), in S910 the processor 210 identifies the candidate model name as the model name of the target printer, and subsequently ends the process in FIGS. 10 and 11. However, if the number of candidate model names is 2 or greater (S880: YES), in S890 the processor 210 calculates the sum of confidences greater than or equal to the third reference value Pt3 for each model name. In S900 and S910 the processor 210 identifies the model name corresponding to the largest sum as the candidate model name, and subsequently ends the process in FIGS. 10 and 11.

As described above, the processor 210 in the second embodiment has a multiple-image mode as an operating mode for identifying the model name of the printer. In the multiple-image mode, the processor 210 inputs a plurality of sets of photographic image data representing a plurality of photographic images taken of the printer into the machine learning model 238 to identify the model name of that printer. Unlike in the first embodiment described in FIGS. 6 and 7, the processor 210 in the second embodiment identifies the model name in the multiple-image mode irrespective of the highest confidence obtained from the initially processed photographic image data. Specifically, the processor 210 inputs L sets of photographic image data (where L is an integer of 2 or greater) into the machine learning model 238 and acquires L confidences for each of the plurality of model names (S740, S750). In other words, the processor 210 inputs L sets of photographic image data (where L is an integer of 2 or greater) into the machine learning model 238 and acquires M confidences (where M is an integer obtained by multiplying L by the number of the plurality of model names) (S740, S750). The processor 210 subsequently uses the L confidences for the plurality of model names to identify the model name of the printer (FIG. 11). By using the L confidences for each of the plurality of model names to identify the model name of the printer in this way, the processor 210 can reduce the potential for misidentifying the model name.

C. Variations of the Embodiments (1) The object to be inspected is not limited to a printer but may be any product, such as a scanner, a multifunction peripheral, a digital camera, a cutting machine, and a portable terminal. Further, the identification information for the object is not limited to a model name but may be any information indicating the class of object when the objects are divided into a plurality of classes. For example, the identification information (i.e., class) may include any of the manufacturing plant, production date, lot number, and manufacturer.

(2) In the process for acquiring the confidence data Dout (S240-S250) in the identification process of FIGS. 6 and 7, the processor 210 may acquire J sets of confidence data Dout by inputting J sets of photographic image data into the machine learning model 238 (where J is an integer of 2 or greater). In this case, in S270 the processor 210 identifies a highest confidence from J×k confidences included in the J sets of confidence data Dout. By inputting one or more sets of photographic image data into the machine learning model 238 in this way, the processor 210 can acquire one or more confidences for each of the plurality of sets of identification information. Thereafter, the processor 210 can compare the highest confidence among the plurality of acquired confidences to the first reference value Pt1.

(3) In the identification process of FIGS. 6 and 7, the method of identifying identification information when a highest confidence greater than or equal to the first reference value Pt1 has not been acquired is not limited to the process of FIG. 7 but may be any of various processes for adopting identification information associated with a high confidence. For example, the processor 210 may calculate a total confidence for each set of identification information based on the plurality of acquired confidences and may adopt the identification information corresponding to the largest total confidence. Further, the processor 210 identifies identification information corresponding to the highest confidence for each of N sets of confidence data Dout. The processor 210 counts the number of times the highest confidence has been obtained for each set of identification information. Thereafter, the processor 210 may adopt the identification information for which the highest confidence has been obtained the greatest number of times.

Similarly, in the identification process of FIGS. 10 and 11, the method of identifying identification information is not limited to the process in FIG. 11 but may be any of various processes that adopt identification information associated with a high confidence. For example, the processor 210 may adopt identification information associated with the largest total confidence. Further, the processor 210 may adopt the identification information for which the highest confidence has been obtained the greatest number of times.

(4) Various other processes for identifying identification information may be used in place of the process in FIGS. 6 and 7 and the process in FIGS. 10 and 11. For example, while the present embodiments and variations use the sum of a plurality of confidences, various index values having a correlation to the magnitude of confidence may be used in place of the sum of confidences, such as the mean or maximum confidence. Further, if there is a great difference in appearance among objects having different identification information (model names, for example), the processor 210 may identify identification information for the object using a single set of photographic image data. For example, the processor 210 may adopt identification information associated with the highest confidence among the plurality of confidences included in a single set of confidence data Dout.

(5) As in the first and second embodiments described above, a plurality of sets of photographic image data representing a single object may be used for training the machine learning model 238 and for identifying identification information. Here, the parts of the object depicted in the target images differ among the sets of photographic image data representing the same object. However, various other photographing conditions may differ among the sets of photographic image data representing the same object.

For example, even though the parts of the object indicated in the target image are substantially the same among the plurality of sets of photographic image data representing the same object, the photographic direction may differ slightly. Even this case can train the machine learning model 238 suitably and can identify identification information appropriately.

Further, the brightness of the light source used when photographing may differ among the plurality of sets of photographic image data representing the same object. A photographic image taken under a bright light source can suitably render the shape of an object having a dark color. A photographic image taken under a dark light source can suitably render the shape of an object having a bright color. When the plurality of objects subjected to inspection include an object having a dark color and an object having a bright color, a plurality of sets of photographic image data corresponding to the different brightnesses of light sources can suitably reflect the shape of each object when training the machine learning model 238 and identifying the identification information.

Further, a plurality of types of light sources may be used for photographing an object, such as a fluorescent lamp and an incandescent lamp. Thus, the type of light source used when photographing may differ among the plurality of sets of photographic image data representing the same object. The distinctness of the shape of an object rendered in a photographic image may differ according to the combination of the color of the object and the type of the light source. When the plurality of objects subjected to inspection include objects having mutually different colors, a plurality of sets of photographic image data corresponding to light sources of different types can suitably reflect the shape of each object for training the machine learning model 238 and for identifying identification information.

Digital cameras of a plurality of models may be used for photographing an object. Thus, the model of the digital camera used for photographing an object may differ among the plurality of sets of photographic image data representing the same object. Characteristics of the photographic images can differ according to the model of the digital camera. Therefore, the distinctness of the shape of an object rendered in a photographic image may differ according to the combination of the model of the digital camera and the object. A plurality of sets of photographic image data corresponding to different models of digital cameras can suitably reflect the shape of each object when training the machine learning model 238 and when identifying identification information.

(6) The photographic image data inputted into the machine learning model 238 may be any of various types of image data representing photographic images of an object. For example, the color space of the photographic image data may be the CMYK color space or another color space rather than the RGB color space. Further, the photographic image data may represent an image using brightness values. In this case, the photographic image data can suitably reflect the shape of each object for training the machine learning model 238 and for identifying identification information, even when the plurality of objects have mutually different colors. Photographic image data inputted into the machine learning model 238 may be generated by executing various image processes on the image data generated by the digital camera 100, such as a resolution converting process, a cropping process, a trimming process, and a color converting process.

(7) Instead of the configuration in FIG. 3, the machine learning model may have any type of configuration for dividing objects into a plurality of classes. For example, the numbers of convolutional layers, pooling layers, and fully connected layers may be modified as needed. Alternatively, the convolutional layers and pooling layers may be omitted, and the machine learning model may be configured solely of fully connected layers. The machine learning model may also be a CNN known as VGG16. A random forest or a support vector machine may also be employed.

(8) The method of training the machine learning model may be any of various methods suited to the machine learning model in place of the method in FIG. 4. For example, the method of adjusting operation parameters included in the machine learning model may be any of various methods in place of the error backpropagation method, such as a method for propagating the target value (also called "target propagation"). Further, the condition for completing training may be any of various conditions indicating that the difference between data outputted from the machine learning mode and the label data (supervised data) are small. For example, the processor 210 may determine that training is complete when a condition indicating that the V error values calculated in S40 are small is met (for example, the average error value is less than or equal to a prescribed reference value). Alternatively, the processor 210 may determine that training is complete when the operator inputs a completion command and may determine that training is not complete when a command to continue training is inputted. The operator may reference the plurality of error values obtained from the plurality of sets of confidence data Dout for evaluation described in S60 of FIG. 4 to determine whether to complete training. Alternatively, the condition for completing training may be repeating the process in S30-S50 a prescribed number of times.

In any case, a learning model that outputs k values for each of k classes may be employed to categorize objects into k classes. By using the following supervised data to train a learning model in this way, the k output values according to the learning model can indicate the confidence of each class (i.e., identification information). The supervised data is configured of k values. The value associated with the correct class is the first value indicating "correct" (1, for example), while the value associated with other classes is the second value indicating "incorrect" (0, for example). Note that the structure and method of training the machine learning model to output a confidence for each of k classes (i.e., identification information) are not limited to this configuration and this training method but may be any of various configurations and training methods.

(9) The process for inspecting objects may be any of various processes instead of the process described in FIG. 9. For example, in S620 the processor 210 may use an object detection model, which is a type of machine learning model, to detect an image of a label associated with the model name of a target object based on photographic images. Various learning models can be employed as the object detection model, such as a model called you only look once (YOLO). Here, k object detection models corresponding one-to-one with the k model names are prepared. Each object detection model is pretrained to detect an image of a label associated with the model name corresponding to the object detection model. In this case, the sets of inspection settings data 239 (see FIG. 1) may each include data identifying the object detection model associated with the inspection settings data. In S130 of FIG. 5, the processor 210 inspects the target object using the object detection model associated with the inspection settings data 239 determined in S126. The inspection process may also be any of various other processes for checking for defects in an object, such as a process for detecting scratches in the object.

In any case, inspection settings specified by the inspection settings data 239 may be any of various settings for inspection in place of image data for a suitable label. For example, when the production line for objects branches into k inspection lines respectively corresponding to the k types of identification information, the inspection settings data 239 may indicate the inspection line on which the object is to be transported. Alternatively, if the object is illuminated by a light source for inspection and the brightness of the light source is adjusted based on identification information for the object, the inspection settings data 239 indicates the brightness of the light source.

(10) The process for training the machine learning model 238 (e.g., the process in FIG. 4), the process for identifying identification information using the photographic image data (e.g., the process in FIGS. 6 and 7 and the process in FIGS. 10 and 11), the process for determining inspection settings using the identification information (e.g., the process in FIG. 8), and the process for inspection using the inspection settings (e.g., the process in FIG. 9) may be executed by different information processing apparatuses. Further, any processes selected from among the training process, the identification process for identifying identification information, the determining process for determining inspection settings, and the inspection process using the inspection settings may be shared among a plurality of devices (e.g., information processing apparatuses such as computers) configured to communicate with each other over a network. For example, the process for identifying identification information and the process for determining inspection settings may be entirely executed by an information processing system that includes one or more information processing apparatuses.

In the embodiments and variations described above, part of the configuration implemented in hardware may be replaced with software and, conversely, all or part of the configuration implemented in software may be replaced with hardware. For example, functions of the machine learning model 238 depicted in FIG. 1 may be implemented with a dedicated hardware circuit.

When all or some of the functions in the present disclosure are implemented with computer programs, the programs can be provided in a form that the programs are stored on a computer-readable storage medium (a non-transitory computer-readable storage medium, for example). The programs may be used in a stored state in the same storage medium on which they were supplied or in a different storage medium (a computer-readable storage medium). The "computer-readable storage medium" may be a portable storage medium, such as a memory card or a CD-ROM; an internal storage device built into the computer, such as any of various ROM or the like; or an external storage device connected to the computer, such as a hard disk drive or the like.

While the specific embodiments and variations of the present disclosure have been described in detail, it would be apparent to those skilled in the art that many modifications and variations may be made therein.

What is claimed is:

1. An information processing system comprising:
a processor configured to perform:
(a) identifying, by inputting photographic image data representing a photographic image of an apparatus into a machine learning model, identification information of the object apparatus, the identification information being information for identifying at least one of: a model of the apparatus, a manufacturing plant of the apparatus, a production date of the apparatus, a lot number of the apparatus, or a manufacturer of the apparatus;
(b) determining, when the identification information identified in (a) is first identification information, first inspection settings as inspection settings used for inspecting whether the apparatus has a defect; and
(c) determining, when the identification information identified in (a) is second identification information, second inspection settings as the inspection settings, the second identification information being different from the first identification information, the second inspection settings being different from the first inspection settings.

2. The information processing system according to claim 1,
wherein the processor has a multiple-image mode as an operating mode for identifying the identification information of the apparatus, the multiple-image mode being a mode in which the processor inputs a plurality of sets of photographic image data representing a plurality of photographic images of the apparatus into the machine learning model to identify the identification information of the apparatus.

3. The information processing system according to claim 2,
wherein the plurality of photographic images represented by the plurality of sets of photographic image data include images of different parts of the apparatus from each other.

4. The information processing system according to claim 2,
wherein the machine learning model is configured to output, based on the photographic image data inputted into the machine learning model, a confidence for each of a plurality of predetermined candidates for the identification information of the apparatus,
wherein, in the identifying in (a), the processor is configured to perform:
(d) acquiring, by inputting one or more sets of photographic image data representing one or more photographic images of the apparatus into the machine learning model, one or more confidences for each of the plurality of predetermined candidates to thereby acquire a plurality of confidences;
(e) identifying, in a case where a first specific confidence is acquired in (d), the candidate corresponding to the acquired first specific confidence as the identification information of the apparatus, the first specific confidence being the highest of the plurality of confidences acquired in (d) and being greater than or equal to a first reference value;
(f) repeating, in a case where the first specific confidence is not acquired in (d), the acquiring in (d) up to N times until the first specific confidence is acquired, wherein N is an integer of two or greater, wherein the repeating in (f) is performed as the multiple-image mode; and
(g) identifying, in a case where the first specific confidence is not acquired even after performing the acquiring in (d) the N times, the identification information of the apparatus using the plurality of confidences acquired by performing the acquiring in (d) the N times.

5. The information processing system according to claim 4,
wherein, in the identifying in (g), the processor is configured to perform:
(h) identifying a specific candidate as the identification information of the apparatus, the specific candidate being the candidate for which a second specific confidence is acquired the largest number of times, the second specific confidence being the confidence that is greater than or equal to a second reference value, the second reference value being smaller than the first reference value.

6. The information processing system according to claim 2,
wherein the machine learning model is configured to output, based on the photographic image data inputted into the machine learning model, a confidence for each of a plurality of predetermined candidates for the identification information of the apparatus, wherein, in the identifying in (a), the processor is configured to perform, as the multiple-image mode:
- (d) acquiring, by inputting L sets of photographic image data representing L photographic images of the apparatus into the machine learning model, L confidences for each of the plurality of predetermined candidates to thereby acquire M confidences, wherein L is an integer of two or greater and M is an integer obtained by multiplying L by the number of the plurality of predetermined candidates; and
- (e) identifying, using the M confidences acquired in (d), the identification information of the apparatus.

7. An information processing method comprising:
- (a) identifying, by inputting photographic image data representing a photographic image of an apparatus into a machine learning model, identification information of the apparatus, the identification information being information for identifying at least one of: a model of the apparatus, a manufacturing plant of the apparatus, a production date of the apparatus, a lot number of the apparatus, or a manufacturer of the apparatus;
- (b) determining, when the identification information identified in (a) is first identification information, first inspection settings as inspection settings used for inspecting whether the apparatus has a defect; and
- (c) determining, when the identification information identified in (a) is second identification information, second inspection settings as the inspection settings, the second identification information being different from the first identification information, the second inspection settings being different from the first inspection settings.

* * * * *